United States Patent
Vogt et al.

(10) Patent No.: US 6,913,728 B2
(45) Date of Patent: Jul. 5, 2005

(54) METHOD OF PRODUCING A MOLDED PART THAT IS DEEP DRAWN FROM A THERMOPLASTIC FOIL

(75) Inventors: Günter Vogt, Rinteln (DE); Rainer Ohlinger, Hannover (DE)

(73) Assignee: Benecke-Kaliko AG (DE)

( * ) Notice: Subject to any disclaimer, the term of this patent is extended or adjusted under 35 U.S.C. 154(b) by 360 days.

(21) Appl. No.: 10/334,371

(22) Filed: Dec. 30, 2002

(65) Prior Publication Data

US 2003/0141612 A1 Jul. 31, 2003

(30) Foreign Application Priority Data

Jan. 25, 2002 (DE) .......................................... 102 02 752

(51) Int. Cl.⁷ ......................... B29C 59/04; B23K 26/36
(52) U.S. Cl. ..................... 264/400; 264/482; 264/40.1; 264/293; 264/320
(58) Field of Search ............................... 264/40.1, 400, 264/482, 293, 320

(56) References Cited

U.S. PATENT DOCUMENTS

| | | | | |
|---|---|---|---|---|
| 4,211,328 A | * | 7/1980 | Petranyi | .................... 206/525 |
| 4,740,335 A | * | 4/1988 | Scholz et al. | .................. 264/22 |
| 5,759,473 A | * | 6/1998 | Minke et al. | ................ 264/400 |

FOREIGN PATENT DOCUMENTS

| | | | |
|---|---|---|---|
| DE | 3135628 | | 3/1983 |
| DE | 3405985 | | 3/1985 |
| DE | 43 24 970 A1 | * | 1/1995 |
| DE | 4441216 | | 5/1996 |
| DE | 19855962 | | 5/2000 |
| JP | 04-089228 | * | 3/1992 |

* cited by examiner

Primary Examiner—Stefan Staicovici
(74) Attorney, Agent, or Firm—R W Becker & Associates; R W Becker

(57) ABSTRACT

A method is provided for producing a molded part that is deep drawn from a thermoplastic foil. An outer surface of the thermoplastic foil is provided with a positive depth structure, under the effect of heat and pressure, by means of a stamping or embossing roller that has a negative depth structure. In at least one extent of a surface of the embossing roller, the negative depth structure of the roller is compressed in such surface regions thereof that effect a stretching of the foil during deep drawing. Subsequently, at least a portion of the foil is deep drawn.

9 Claims, No Drawings

METHOD OF PRODUCING A MOLDED PART THAT IS DEEP DRAWN FROM A THERMOPLASTIC FOIL

BACKGROUND OF THE INVENTION

The present invention relates to a method of producing a molded part that is deep drawn from a thermoplastic thin sheet or foil.

DE 34 05 985 C2 discloses a method of producing a stamping or embossing roller for the continuous stamping or embossing of the outer surface of a thermoplastic foil, according to which, proceeding from a grained member in the form of a natural leather, the peripheral surface of the embossing roller is provided with a negative form of the depth structure of the natural leather member, and with the thus provided embossing roller, under the effect of heat and pressure, a thermoplastic foil is continuously embossed, whereby the embossed surface thereof is provided with the depth structure of the leather member in a positive form. It is known in general to convert such an embossed thermoplastic foil into spatial or three-dimensional molded parts by means of a deep drawing process, for example into interior decorative parts of motor vehicles.

During such a deep drawing process, the thermoplastic foil is stretched or expanded in different ways as a function of the spatial form of the molded part that is to be produced, so that the grained structure is also differently stretched. As a consequence, there results the drawback that the molded part that is produced has a varying appearance over its surface, which is not desirable. It is therefore an object of the present invention to provide a method of the aforementioned general type that avoids the drawbacks of the state of the art, and that improves the appearance of the deep-drawn molded part.

SUMMARY OF THE INVENTION AND DESCRIPTION OF PREFERRED EMBODIMENTS

This object is realized by a method that provides an outer surface of the thermoplastic foil with a positive depth structure or definition, under the effect of heat and pressure, by means of a stamping or embossing roller that has a negative depth structure, wherein in at least one extent or dimension of a surface of the embossing roller, the negative depth structure of the roller is compressed in such surface regions that effect a stretching or expansion of the foil during deep drawing; thereafter, at least a portion of the foil is deep drawn in a deep drawing device.

The basic concept of the inventive method is that the unavoidable stretching, which is not uniform over the surface, is, during the deep drawing process, counteracted by or offset with an appropriate compression of the thermoplastic foil that is subjected to the deep drawing process, whereby this compression is, of course, effected in those surface regions that effect a stretching of the foil during deep drawing. Thus, during the deep drawing process the previously carried-out compression is for all practical purposes again eliminated, and thereby a depth structure is achieved in the finished molded part that over its entire surface is extensively or completely uniform.

Since the thermoplastic foil that is prepared for the deep drawing process is provided with the positive depth structure in a continuous process by the embossing roller under the effect of heat and pressure, it is provided pursuant to a further embodiment of the present invention that the compression of the depth structure not be first effected in the final embossed thermoplastic foil, but already by means of an appropriate compression of the negative depth structure in the embossing roller, so that after the embossing process the thermoplastic foil, in the desired manner, is provided with the compressions of the surface structure as a function of the stretching of the deep drawing process.

The amount of the compression expediently corresponds to the amount of the stretching.

Pursuant to another embodiment of the basic concept of the present invention, the compression of the negative depth structure in the surface of the embossing roller is effected by controlling the relative movement of a laser, which produces the depth structure in the embossing roller, relative to the surface of the roller. This means that a compression is effected by slowing down the relative movement between the laser and the embossing roller, and in particular, depending upon need, not only in the circumferential direction, but also in the axial direction of the embossing roller.

Pursuant to another embodiment of the basic concept of the present invention, the surface of the embossing roller is composed of partial surface sections or regions. In this connection, the partial surfaces have a varying degree of compression in conformity with the degree of stretching or drawing during the subsequent deep drawing process, whereby the degree of compression is preferably essentially inversely proportional to the degree of stretching or drawing during the deep drawing process. Due to the varying compression of the partial surface regions, the surface stretching thereof also varies. The greater the degree of compression, the smaller becomes the partial surface. For this reason, a surface adaptation of the partial surfaces is necessary when putting together the surface of the embossing roller, which, however, can be effected in a desired manner that is familiar to anyone skilled in the art.

Pursuant to another embodiment of the inventive method, the depth structure of the surface of the embossing roller is first represented optically as a black/white or colored pattern, and the compressions are produced by optical distortion of the pattern. The depth structure of the surface of the embossing roller is produced with the aid of the thus distorted pattern. The conversion of the depth structure into an optical pattern thus provides the possibility of achieving the compressions in an optical fashion.

Pursuant to a further development of this embodiment, the distorted pattern is sensed or detected photo electrically, and with a thus formed electrical signal the intensity of a laser beam is controlled that, in conformity to the sensing of the pattern, is moved relative to the surface of the embossing roller and thus produces the depth structure in the surface of the roller.

Pursuant to that embodiment of the inventive method where the surface of the embossing roller is composed of partial surface sections, it is expedient pursuant to a further development to store the depth structure of a partial surface in an electronic storage means as partial surface information. This storage is advantageous for the later processing. In addition, a portion of a foil, in a size that is suitable for the deep drawing process, is provided with a preferably optical pattern and is thereafter subjected to the deep drawing process. This makes it possible to obtain surface-related stretching values with the aid of the deformation of the pattern during the deep drawing process. Thereafter, the stored partial surface information is read several times out of the storage means and is respectively compressed as a function of the surface-related stretching values. Finally, the surface-related, compressed partial surface information is combined by calculation to a gross or aggregate information with which the intensity of a laser beam is controlled that is moved relative to the surface of an embossing roller so that the depth structure at the surface of the embossing roller is thus produced. With this embodiment of the inventive basic concept, it is advantageous if the transitions between adjacent partial surface informations of varying degrees of compression be processed such that transitions between the depth structures of varying degrees of compression be substantially non-visible. Since the surface information is expediently present as digital information that is stored in a digital electronic storage means, there can be used for the processing of the transitions between adjacent partial surface informations processes that are familiar to anyone skilled in the art of information and are known, for example, from DE 4326874 C3.

The specification incorporates by reference the disclosure of German priority document DE 102 02 752.8 filed Jan. 25, 2002.

The present invention is, of course, in no way restricted to the specific disclosure of the specification and drawings, but also encompasses any modifications within the scope of the appended claims.

We claim:

1. A method of producing a molded part that is deep drawn from a thermoplastic foil, said method including the steps of:

providing a surface of said thermoplastic foil with a positive depth structure, under the effect of heat and pressure, by means of an embossing roller that has a negative depth structure, wherein in at least one extent of a surface of said negative embossing roller, said negative depth structure of said roller is compressed in such surface regions thereof that effect a stretching of said foil during deep drawing; and deep drawing at least a portion of said foil such that an amount of stretching of said foil thereof during said deep drawing is counteracted by or offset with an appropriate amount of compression of said foil by said embossing roller.

2. A method according to claim 1, which includes the step of effecting said compression in said negative depth structure in said surface of said embossing roller by controlling a relative movement of a laser, which produces a depth structure in said embossing roller, relative to said surface of said embossing roller.

3. A method according to claim 1, wherein said surface of said embossing roller is composed of partial surface regions, and wherein said depth structure of said partial surface regions is formed with varying degrees of compression.

4. A method according to claim 3, wherein said degree of compression is essentially inversely proportional to a degree of stretching during a deep drawing process.

5. A method according to claim 1, wherein said depth structure of said surface of said embossing roller is initially optically represented as a black/white or colored pattern, wherein compression is produced by optical distortion of said pattern, and wherein with the aid of said distorted pattern, said depth structure is produced in said surface of said embossing roller.

6. A method according to claim 5, wherein said distorted pattern is photoelectrically sensed and a corresponding electrical signal is formed that controls an intensity of a laser beam that, in conformity with said sensing of said pattern, is moved relative to said surface of said embossing roller to thereby produce said negative depth structure in said surface of said embossing roller.

7. A method according to claim 3, wherein the depth structure of a partial surface region is stored as partial surface information in an electronic storage means, wherein a portion of said foil, in a size suitable for a deep drawing process, is provided with a pattern, and is subsequently subjected to a deep drawing process, wherein with the aid of a deformation of said pattern during said deep drawing process surface-related stretching values are obtained, wherein said stored partial surface information is read several times out of said storage means and is respectively compressed as a function of said surface-related stretching values, wherein said surface-related, compressed partial surface information is combined by calculation to an aggregate information, and wherein said aggregate information is used to control an intensity of a laser beam that is moved relative to said surface of said embossing roller to thereby produce said depth structure in said surface of said embossing roller.

8. A method according to claim 7, wherein transitions between adjacent partial surface informations of varying degrees of compression are processed such that transitions between depth structures having varying degrees of compression are largely non-visible.

9. A method according to claim 7, wherein said pattern is an optical pattern.

* * * * *